(No Model.)
W. L. B. CUSHING & A. D. VEST.
ANIMAL TRAP.
No. 295,486. Patented Mar. 18, 1884.
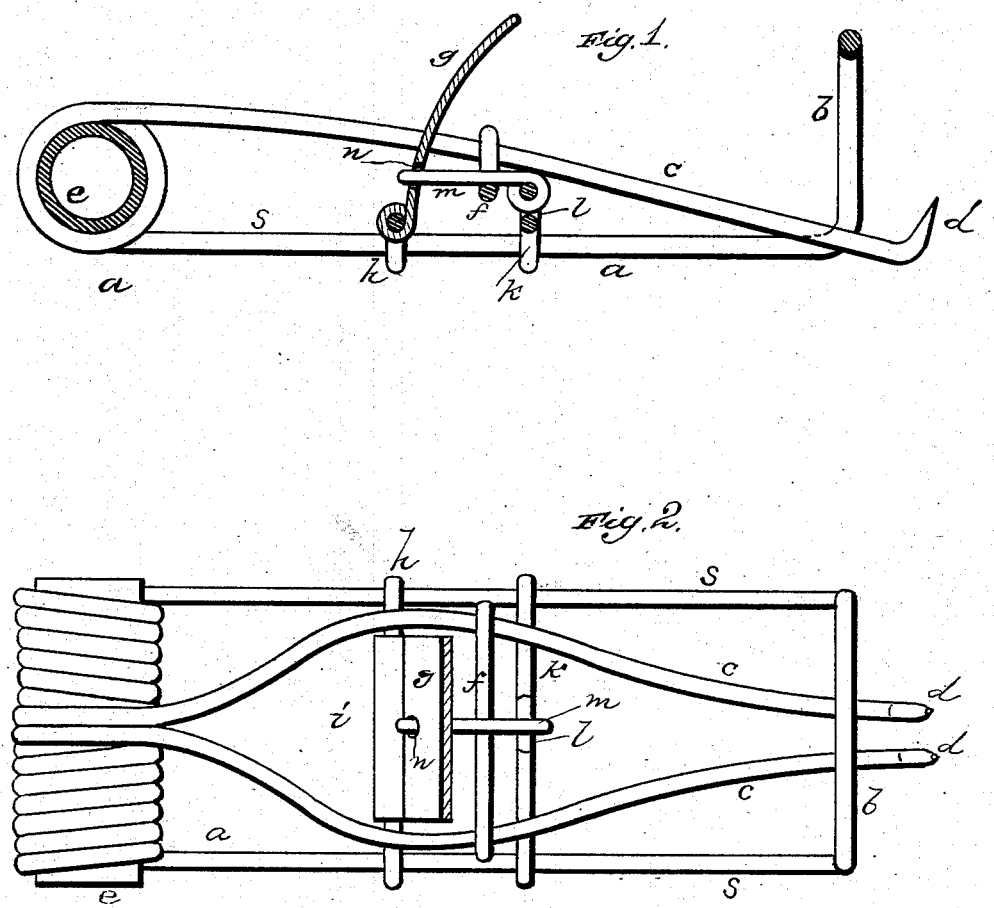
WITNESSES
INVENTORS
W. L. B. Cushing
Americus D. Vest
by Anderson & Smith
their ATTORNEYS

UNITED STATES PATENT OFFICE.

WILLIAM L. B. CUSHING AND AMERICUS D. VEST, OF SAN JOSÉ; SAID VEST ASSIGNOR TO THOMAS A. VEST, OF NORTH SAN JUAN, CALIFORNIA.

ANIMAL-TRAP.

SPECIFICATION forming part of Letters Patent No. 295,486, dated March 18, 1884.

Application filed August 11, 1883. (No model.)

*To all whom it may concern:*

Be it known that we, W. L. B. CUSHING and A. D. VEST, citizens of the United States of America, residing at San José, in the county of Santa Clara and State of California, have invented certain new and useful Improvements in Animal-Traps; and we do declare the following to be a full, clear, and exact description of the invention, such as will enable others skilled in the art to which it appertains to make and use the same, reference being had to the accompanying drawings, and to letters and figures of reference marked thereon, which form a part of this specification.

Figure 1 of the drawings is a representation of a vertical longitudinal section of our improved animal-trap, and Fig. 2 is a plan view of the animal-trap.

This invention has relation to animal-traps for catching squirrels, gophers, moles, and the like; and it consists in the construction and novel arrangement of parts, as will be hereinafter fully described, and particularly pointed out in the claim appended.

Referring by letter to the accompanying drawings, $a$ designates a spring-frame formed from a single piece of suitable wire, bent at its middle to form an arch, $b$, extending at right angles to the arms $c\ c$. The arms $c\ c$ are provided at their ends with teeth $d\ d$, and are coiled at about the middle of their length around a short tube, $e$, the spirals of the coil beginning at the ends of the tube and progressing inwardly until the wires of the arms meet at the middle of the tube, the outer spirals being soldered to the tube. The arms are then extended forward in the direction of the arch $b$, and are bent outwardly, then extended forward for a short distance and bent inwardly, but not so far as to come in contact, and are connected by a downwardly-curved cross-bar, $f$, at the inner bends, and then extended forward until the teeth pass under the arch.

$g$ designates the trip-plate, which is hinged to a cross-wire, $h$, connecting the rods $s\ s$ at a point below the enlarged portion $i$ of the arms $c\ c$, through which its upper end passes in rear of the curved cross-bar $f$.

$k$ designates a cross-wire having a central eye, $l$, located in front of the trip-plate, on the same branch of the frame, the eye $l$ of which engages the eye of the set-rod $m$. The trip-plate $g$ is provided near its hinged end with a perforation, $n$.

To set the trap, the upper portion of the spring-frame is pushed down until the set-rod $m$ can be crossed over the downwardly-curved cross-bar $f$, and the trip-plate caused to engage the point of the set-rod by its perforation $n$. The trap is then secured in the entrance or exit leading to the animal's nest, and secured therein in any suitable manner. As the trap offers but little obstruction to the light, the animal will attempt to force its way out, and will trip the plate, and will consequently be caught between the arch and the teeth, where it will be held until taken out. No bait is necessary in using the trap, and it may be set to catch the animal as it enters its nest, if it is known to be out at the time of setting the trap. It is cheap, simple, and durable, and never fails to catch the animal when it comes to it.

Having thus fully described our invention, what we claim as new, and desire to secure by Letters Patent, is—

The combination, with the spring-frame $a$, having the arch $b$ at its front, and its arms $c\ c$, coiled around and secured to the tube $e$, extended forward from the coil, provided with the enlargement $i$, connected in front of the enlargement by the downwardly-curved cross-bar $f$, and provided at the points with the teeth $d\ d$, of the hinged and perforated trip-plate $g$, and the set-rod $m$, constructed and adapted to operate substantially as specified.

In testimony whereof we affix our signatures in presence of two witnesses.

WILLIAM L. B. CUSHING.
AMERICUS D. VEST.

Witnesses:
J. E. BROWN,
GOLDWIN BROWN.